(12) United States Patent
de Oliveira et al.

(10) Patent No.: US 9,182,501 B2
(45) Date of Patent: Nov. 10, 2015

(54) DETECTOR-READOUT INTERFACE FOR AN AVALANCHE PARTICLE DETECTOR

(75) Inventors: Rui de Oliveira, Arenthon (FR); Ioannis Giomataris, Versailles (FR)

(73) Assignees: CERN-European Organization for Nuclear Research, Geneva (CH); CEA, Gif-sur-Yvette (FR)

( * ) Notice: Subject to any disclaimer, the term of this patent is extended or adjusted under 35 U.S.C. 154(b) by 36 days.

(21) Appl. No.: 14/240,858

(22) PCT Filed: Aug. 10, 2012

(86) PCT No.: PCT/EP2012/003429
§ 371 (c)(1),
(2), (4) Date: Apr. 29, 2014

(87) PCT Pub. No.: WO2013/029748
PCT Pub. Date: Mar. 7, 2013

(65) Prior Publication Data
US 2014/0239185 A1    Aug. 28, 2014

(30) Foreign Application Priority Data
Aug. 26, 2011    (EP) .................................... 11290383

(51) Int. Cl.
*G01T 1/185*    (2006.01)
*G01T 1/29*    (2006.01)
*H01J 47/02*    (2006.01)

(52) U.S. Cl.
CPC ............... *G01T 1/185* (2013.01); *G01T 1/2935* (2013.01); *H01J 47/02* (2013.01)

(58) Field of Classification Search
CPC ......... G01T 1/185; G01T 1/1935; H01J 47/02
See application file for complete search history.

(56) References Cited

U.S. PATENT DOCUMENTS

| 5,686,721 A | * | 11/1997 | Schmidt-Böcking ... 250/214 VT |
| 6,011,265 A | | 1/2000 | Sauli |
| 6,133,575 A | | 10/2000 | Charpak et al. |

(Continued)

FOREIGN PATENT DOCUMENTS

| FR | 2786024 A1 | 5/2000 |
| WO | 2010091695 A2 | 8/2010 |
| WO | 2011054365 A1 | 5/2011 |

OTHER PUBLICATIONS

International Search Report & Written Opinion of the International Searching Authority dated Nov. 9, 2012 for International Application No. PCT/EP2012/003429. 9 Pages.

*Primary Examiner* — Yara B Green
(74) *Attorney, Agent, or Firm* — Eschweiler & Associates, LLC

(57) ABSTRACT

A detector-readout interface for an avalanche particle detector comprises a resistive layer formed at a bottom side of a gas chamber and a dielectric layer formed under said resistive layer and is adapted for capacitive coupling to an external readout board. This provides a modular detector configuration in which the readout card and detector core can be combined freely and interchangeably. The readout board can even be removed or replaced without switching off the detector. At the same time, the configuration provides an effective protection against sparks and discharges, and in particular obliviates the need for additional protecting circuits. The configuration may be employed in any avalanche particle detector, such as the MicroMegas or GEM detectors.

18 Claims, 2 Drawing Sheets

(56) References Cited

U.S. PATENT DOCUMENTS

Figure 1:
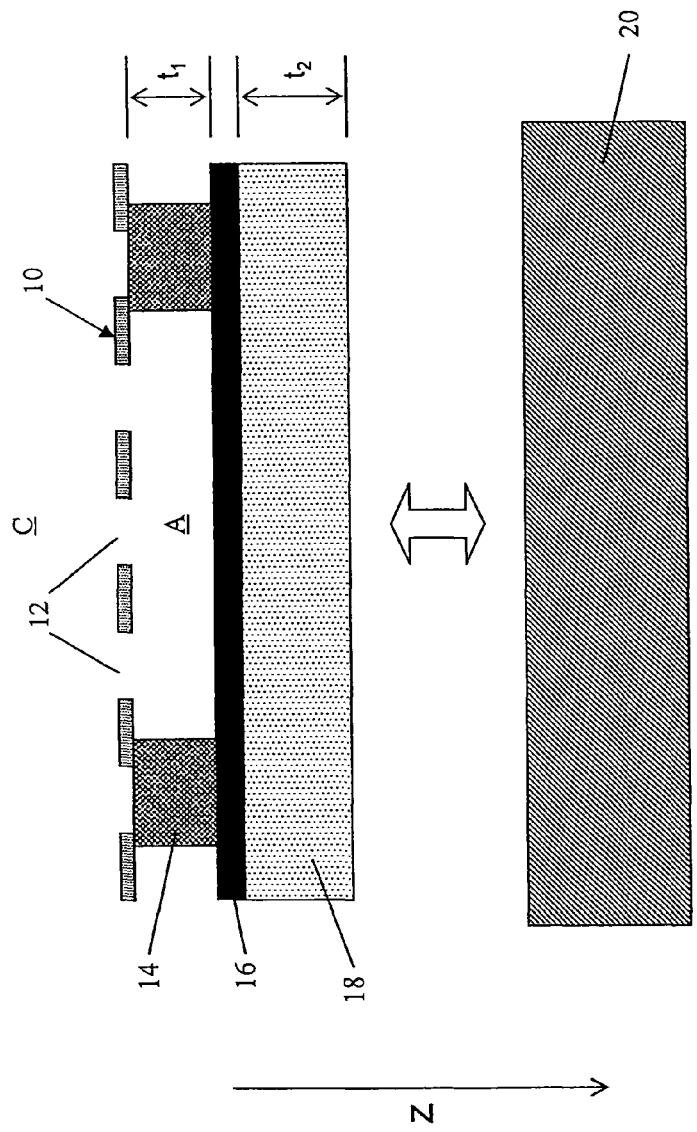

| | | |
|---|---|---|
| 6,362,484 B1 | 3/2002 | Beyne et al. |
| 7,639,783 B1 | 12/2009 | Diawara et al. |
| 8,575,561 B2 | 11/2013 | De Oliveira |
| 2011/0272591 A1 | 11/2011 | De Oliveira |

* cited by examiner

DETECTOR-READOUT INTERFACE FOR AN AVALANCHE PARTICLE DETECTOR

FIELD OF THE INVENTION

The present invention relates to an interface between a detector vessel and a readout structure for an avalanche particle detector, in particular for a MicroPattern Gas Detector (MPGD) such as the MicroMegas detector.

BACKGROUND AND RELEVANT STATE OF THE ART

Particle detectors are devices to detect, track and/or identify radiation or particles and find wide applications throughout particle physics, biology as well as medical technology.

Particle detectors exploiting in the process of ionization and charge multiplication in gases have been in use with continued improvements ever since Rutherford first employed a gas-filled wire counter to study natural radioactivity more than a century ago. Techniques for designing detectors of increased physical size and/or increased robustness to discharges and/or enhanced spatial resolution continue to be an active field of research in the detector community today.

Gaseous detectors typically collect the electrons released by ionising radiation and guide them to regions with a strong electric field, thereby initiating an electron avalanche. The avalanche is able to produce enough electrons to create a current or charge large enough to be collected on a readout device and analysed by means of readout electronics. The collected electron charge may indicate the charge, energy, momentum, direction of travel, and other attributes of the incident particles or radiation.

Conventionally, the large amplification field necessary to initiate and support the electron avalanche has come from a thin wire at a positive high voltage potential. This same thin wire has conventionally been employed to collect the electrons from the avalanche and to guide them towards the readout electronics. More recently, so-called MicroPattern Gas Detectors (MPGDs) such as the MicroMesh Gaseous Structure Chamber (MicroMegas) and the Gas Electron Multiplier (GEM) that employ semiconductor fabrication techniques have made it possible to mass-produce detector devices in an impressive variety of geometries while at the same time permitting small avalanche gaps and hence rapid signal development in combination with fast readout and high reliability.

In MPGDs, the electrons generated in the amplification process are conventionally collected on metallic readout pads or strips that are arranged in a predetermined pattern on a semiconductor substrate and electrically connected to fast readout electronics by means of wire connections. For the example of a MicroMegas detector, this configuration is described in U.S. Pat. No. 6,133,575, whereas a GEM detector is described in U.S. Pat. No. 6,011,265.

A serious problem generally encountered in gas-filled proportional chambers is sparking induced by heavily ionising particles that may trigger large number of electrons. Amplified by the avalanche process, they may reach the Raether limit of a few $10^7$ electrons, and may evolve into a discharge. This is a particular challenge for modern accelerators with high luminosities, which may produce high count rates from slowly-moving recoils originating from elastic scattering and/or low-energy hydronic debris from nuclear breakup.

Sparks can lead to a temporary high voltage breakdown and hence may give rise to unwanted detector dead times, in which the detector needs to recover and no new events can be detected. Sparks may also damage the readout pads and/or readout electronics. To reduce detector dead times and to avoid damage, most detectors employ additional protecting circuits that interface the readout strips or pads with the front end electronics. These protection circuits add to the complexity of the device and require additional wiring, which conflicts with the desire to form detector devices with ever more and ever smaller readout pads.

Efficient protection against discharges is particularly important in modern grid pixel ("GridPix") detectors, in which the set of readout pads and readout circuits is replaced by a semiconductor readout board or pixel chip integrated into the detector structure. The readout chip of a grid pixel detector may double as the anode of the detector device, and may incorporate a large number of square pixels each connected to its respective pre-amplifier, discriminator and digital counter. An example of a grid pixel detector in which a MicroMegas detector is placed directly on a pixel chip is described in further detail in P. Colas et al., Nucl. Instr. and Meth. A 535 (2004), p. 506.

In comparison with conventional MPGDs, grid pixel detectors have the advantage that they integrate much of the readout circuitry, thereby allowing to form smaller more compact detector devices and to enhance the spatial detector resolution. However, this structure is particularly sensitive to discharges. Even a local discharge will not effect only a single readout channel, as is the case in conventional MPGDs. Rather, discharges may result in a local melting or evaporation of chip material or a breakdown of electronic circuitry that will affect the entire chip. Since the chip is integrated into the detector structure, often the entire structure will need to be replaced.

In order to protect the chip of a grid pixel detector from discharges, a high-resistive layer of 5 µm up to 25 µm of amorphous silicon may be deposited on the chip, as described in I. Bilevych et al., Nucl. Instrum. Meth. A 629 (2011) 66-73. When a discharge propagates through the gas, a charge builds up at the surface of the silicon, thereby locally reducing the electric field and spreading the charge both in time and location. However, this high-resistive layer alone may not be sufficient to protect the chip against discharges in the harsh background environments encountered at large energies and high luminosities.

What is needed is a detector device that allows to provide an efficient protection of the readout board against discharges, and at the same time allows for an easy repair at low costs if discharges should nevertheless occur.

OVERVIEW OF THE PRESENT INVENTION

This objective is achieved by means of a detector-readout interface according to claim 1. The dependent claims relate to preferred embodiments.

A detector-readout interface for an avalanche particle detector according to the present invention comprises at least part of a gas chamber of said avalanche particle detector, a resistive layer formed at the bottom side of said gas chamber, and a dielectric layer formed under said resistive layer. Said detector-readout interface is adapted for being capacitively coupled to a readout board that comprises readout electronics for said avalanche particle detector.

The detector-readout interface according to the present invention is an interface between a detector core in which electrons are generated through incident ionising radiation and multiplied to form an electron avalanche in said gas chamber, and a readout structure in which the collected charges are analysed by means of readout electronics. Countering the trend towards integration of these functionalities in state-of-the-art grid pixel detectors, it is the realisation of the inventors that a better protection against discharges may be achieved by providing a modular detector configuration in which the detector core is separated from the readout plane. This can be achieved by providing a detector-readout interface with a resistive layer and dielectric layer formed under said resistive layer that allow capacitive coupling to a readout board which comprises all the readout electronics.

A detector-readout interface employing capacitive coupling provides full spark protection of the readout electronics, and completely obliviates the need to protect the readout chip by means of an additional protecting circuit or a high-resistive layer formed directly on the chip.

At the same time, the detector-readout interface according to the present invention permits a modular detector design, in which the readout board can be removed or replaced without affecting the detector core, even without switching off the detector. On the one hand, this allows to replace a faulty or damaged readout chip easily and at relatively low costs, and without the need to replace the entire detector structure. On the other hand, a modular detector configuration according to the present invention has the advantage that it allows to manufacture both the detector elements and the readout boards in a variety of different designs and adapted to different applications, and to freely combine these components. The user may hence choose a suitable detector configuration adapted to the type and energy of radiation encountered in a specific application, and may subsequently and independently choose a readout card that fits his needs.

The present invention further allows to accommodate readout electronics in a small space without creating dead space, thereby reducing the detector size and enhancing the spatial resolution.

In a preferred embodiment, the detector-readout interface is adapted for being only capacitively coupled to said readout board.

Preferably, said detector-readout interface or detector core does not comprise readout electronics for said avalanche particle detector, and does not comprise electrically conductive connections for coupling to said readout board.

In a preferred embodiment, said resistive layer is a continuous layer, and preferably extends across at least half of the lower surface area, particularly across the entire lower surface area of said gas chamber. This allows to provide a particularly effective discharge protection.

In a preferred embodiment, said resistive layer confines said gas chamber at a bottom side thereof.

Preferably, said resistive layer and/or said dielectric layer seal said gas chamber.

The dielectric layer may also double as a wall of the detector vessel.

Hence, said resistive layer and/or dielectric layer not only serve to provide an efficient discharge protection or wall of the detector vessel, but may seal the gas chamber of said avalanche particle detector against the environment, and in particular against said readout board. Sealed detectors are required in many industrial applications, such as industrial fluorescence, radiology, or UV photodetection.

In a preferred embodiment, said gas chamber comprises an amplification gap, which may be confined by said resistive layer at a bottom side of said amplification gap, wherein the thickness $t_2$ of said dielectric layer and the thickness $t_1$ of said amplification gap are chosen such that $$t_2 \ll t_1 \times \frac{\varepsilon_2}{\varepsilon_1},$$

wherein $\varepsilon_1$ denotes a dielectric constant of a gas filling of said amplification gap, and $\varepsilon_2$ denotes a dielectric constant of said dielectric layer.

Alternatively, said gas chamber may comprise a collection gap, which may preferably be confined by said resistive layer at a bottom side of said collection gap, such as the collection gap of a GEM detector, wherein the thickness $t_2$ of said dielectric layer and the thickness $t_1$ of said collection gap are chosen such that $$t_2 \ll t_1 \times \frac{\varepsilon_2}{\varepsilon_1},$$

wherein $\varepsilon_1$ denotes a dielectric constant of a gas filling of said collection gap, and $\varepsilon_2$ denotes a dielectric constant of said dielectric layer.

This relation ensures an efficient capacitive coupling between the detector-readout interface and the readout board on which the detector-readout interface may be placed, and in particular ensures that the induced signals triggered by localised events in the amplification gap/collection gap remain sufficiently localised on the readout board. If the thickness $t_2$ of the dielectric layer were too large compared to the ratio $$t_1 \times \frac{\varepsilon_2}{\varepsilon_1},$$

signals would predominantly spread out laterally in the dielectric layer. The signals induced in the readout board by means of capacitive coupling would then be weak, or would be poorly localised, degrading both the detector performance and the resolution.

The inventors found that good results can be achieved if $$t_2 \leq 0.2 \times t_1 \times \frac{\varepsilon_2}{\varepsilon_1},$$

and preferably $$t_2 \leq 0.1 \times t_1 \times \frac{\varepsilon_2}{\varepsilon_1},.$$

The dielectric layer may double as a wall of the detector vessel, and in this case should preferably be kept at a substantial thickness. Preferably, $t_2 \geq 10$ μm, and particularly $t_2 \geq 50$ μm. Very good results can be achieved with 75 μm $\leq t_2 \leq$ 125 μm.

Even if $t_2$ is relatively large, the above relation can be satisfied by choosing the dielectric material of the dielectric layer such that $\varepsilon_2$ is sufficiently high. Preferably, said dielectric layer has a dielectric constant $\varepsilon_2 \geq 10$, and particularly $\varepsilon_2 \geq 100$.

In a preferred embodiment, said dielectric layer comprises ceramics and/or an organic composite (for example a glass epoxy composite).

The properties of the resistive layer likewise have an important effect on the capacitive coupling between the detector-readout interface and the readout board. In general, its resistance for charge transport along a direction Z perpendicular to an upper surface of said resistive layer may be different from a resistance for charge transport along a direction parallel to the upper surface of said resistive layer. The resistance for charge transfer in a direction parallel to the upper surface determines how signals propagate in a lateral direction of the detector readout interface, and hence determines how many of the pixel cells of the readout board are triggered or affected by a single event. The resistance in a direction perpendicular to the upper surface of the resistive layer determines the signal propagation in a vertical direction. By suitably adjusting the values of both the resistance in direction Z and the resistance in the direction perpendicular to Z (parallel to the upper surface of the resistive layer), as well as by adjusting their ratio, the level of coupling to the readout board as well as the spatial resolution of the detector device can be carefully controlled.

In a preferred embodiment, said resistive layer has a surface resistivity of at least 500 kΩ per square. Particularly good results can be achieved with a surface resistivity of at least 1 MΩ per square.

In a preferred embodiment, said resistive layer has a surface resistivity of at most 100 GΩ per square, preferably at most 100 MΩ per square.

In particular, said surface resistivity may be a surface resistivity for charge transport in a direction parallel to an upper surface of said resistive layer.

The resistive layer may serve as the anode of the avalanche particle detector.

According to a preferred embodiment, said resistive layer has a thickness in the range of 3 µm to 50 µm, preferably in the range of 5 µm to 30 µm.

It is usually a challenge in gas detectors to find a resistive layer of an appropriate resistivity and good surface quality. The inventors found that good results can be achieved with a resistive layer that comprises ruthenium oxide and/or a polymer resistive.

The present invention is effective for avalanche particle detectors of different types and functionality, including both the MicroMegas detector and the GEM detector.

In a preferred embodiment, said detector-readout interface further comprises first and second plane electrodes placed in said gas chamber, wherein said first electrode and said second electrode delimit a conversion gap for generation of electrons by incident particles, said second electrode is perforated by holes, and said second electrode and said resistive layer delimit an amplification gap for multiplication of electrons in an avalanche process.

Alternatively, said detector-readout interface may comprise first and second plane electrodes placed in said gas chamber, wherein said first electrode is spaced both from said second electrode and from said resistive layer and comprises an insulator having first and second metal coating layers on opposed surface sides thereof, as well as a plurality of holes extending through said first electrode. The detector-readout interface may further comprise polarization means coupled to said coating layer and adapted to raise said first coating layer to a first potential, and to raise said second coating layer to a second potential higher than said first potential. With suitable potentials applied to the first and second coating layers, the through-holes formed in said first electrode may serve as an amplification gap of an avalanche particle detector. A collection gap may be defined between said resistive layer and said first electrode.

The present invention likewise relate to an avalanche particle detector, comprising a detector-readout interface with some or all of the features described above, as well as a readout board that comprises readout electronics for said avalanche particle detector, wherein said detector-readout interface is capacitively coupled to said readout board.

Preferably, said readout board may comprise a pixel chip or an integrated chip.

In a preferred embodiment, said detector-readout interface is placed on said readout board and/or connected to said readout board.

Preferably, said detector-readout interface is not fixed to said readout board, but is reversibly connected to said readout board.

This feature allows a modular detector configuration in which a suitable detector-readout interface and a suitable readout board may be chosen or manufactured individually, depending on the type of the application, and may then be reversibly combined into a detector with the desired properties. At the same time, a readout board reversibly connected to said detector-readout interface may be easily removed for maintenance or replacement. This is a decisive advantage over conventional integrated grid pixel detectors, in which the entire detector structure needs to be replaced in case either the readout pads or the readout electronics are damaged due to discharges.

In a preferred embodiment, said detector-readout interface or detector core does not comprise electrically conductive connections coupling said detector-readout interface to said readout board.

Preferably, the avalanche particle detector further comprises polarisation means adapted to raise said readout board and/or said resistive layer to a predetermined potential.

DETAILED DESCRIPTION OF PREFERRED EMBODIMENTS

Figure 2:
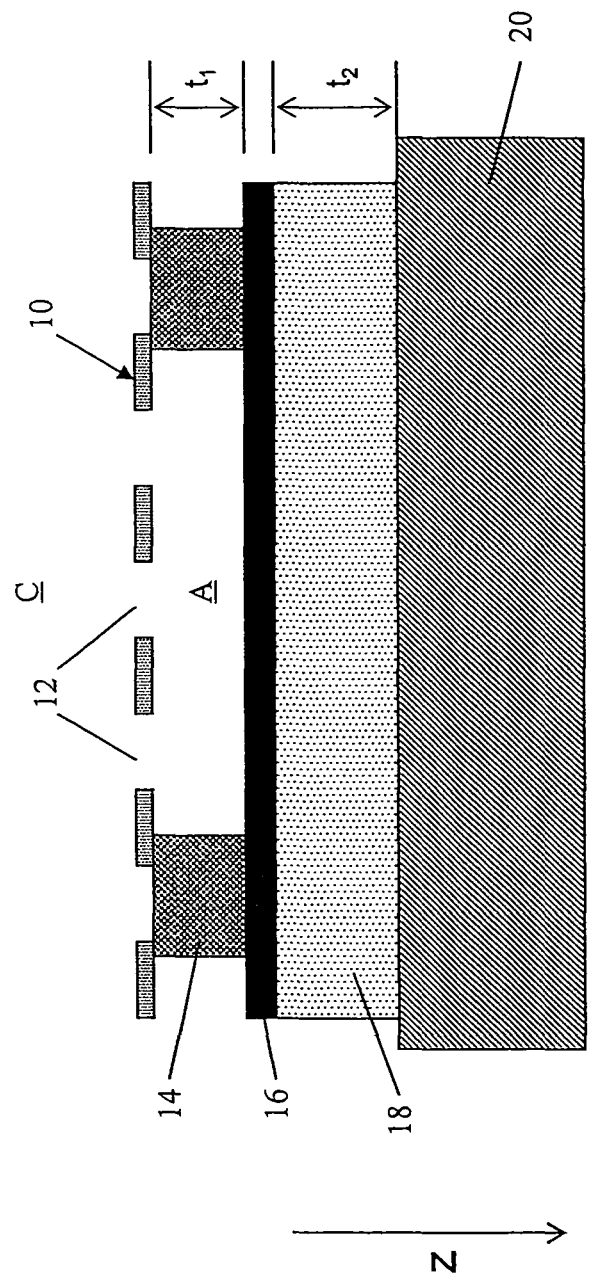

The features and numerous advantages of a detector-readout interface and avalanche particle detector according to the present invention will be best appreciated from a detailed description of the accompanying drawings, in which:

FIG. 1 is a sectional sideview of a detector-readout interface for an avalanche particle detector according to the present invention, when separated from a readout board; and FIG. 2 is a corresponding sectional sideview of the same detector-readout interface when connected with a readout board to form an avalanche particle detector.

The detector-readout interface according to the present invention will now be described with reference to FIGS. 1 and 2 for the specific example of a MicroMegas detector. The general design and functionality of this detector is well known to those skilled in the art and is described in further detail in patent applications EP 0 855 086, EP 0 872 874, and WO 00/30150, to which reference is made.

MicroMegas detectors have a gas chamber comprising a planar (drift) electrode, a gas gap of a few millimeter thickness acting as a conversion and drift region C, and a thin metallic mesh electrode 10 with trough holes 12 separating the conversion region C from an amplification gap A. Only the lower part of the conversion gap C, the amplification gap A as well as the metallic mesh 10 supported on pillars 14 are shown in FIGS. 1 and 2. For ease of presentation, the drift electrode, the upper part of the conversion region C as well as the detector vessel are not shown in FIGS. 1 and 2. These details are inessential to the functioning of the detector-readout interface according to the present invention, and hence their description will be omitted.

The mesh 10, through holes 12, pillars 14 and amplification gap A may be formed by any conventional fabrication technique. In particular, semiconductor lithography may be employed as described in European patent application EP 2 317 538 A1.

The detector-readout interface according to the present invention confines the amplification gap A at a bottom side thereof, and doubles as a bottom wall of the detector vessel. It comprises a resistive layer 16 that extends continuously across the entire lower surface area of the amplification gap A. The pillars 14 that support the mesh electrode 10 are formed on the resistive layer 16. The detector-readout interface further comprises a dielectric layer 18 on which the resistive layer 16 is formed. In combination, the resistive layer 16 and dielectric layer 18 serve to capacitively couple the detector device to an underlying readout board 20, as will be described further below.

The resistive layer 16 is formed from ruthenium oxide ($RuO_2$) at a thickness of approximately 10 µm, and can be prepared by standard screen printing techniques. Polymer resistors instead of ruthenium oxide may likewise be employed to form the resistive layer 16.

The surface resistivity or sheet resistivity $R_s$ of the resistive layer 16 may be chosen at 100 MΩ per square, but may in general range between 1 MΩ per square to hundreds of MΩ per square, and for glass can even be bigger than 1 GΩ per square.

The surface resistivity or sheet resistivity $R_s$ of a rectangular block of uniform material with a height h, length l and width w is generally given by $$\frac{\rho}{h},$$

where ρ is the specific resistance of the material. The total resistance R for charge transport along the length l of the substrate is then given in terms of the surface resistivity $R_s$ as $$R = R_s \times \frac{l}{w} = \frac{\rho}{h} \times \frac{l}{w}.$$

For a resistive layer 16 with quadratic surface area, l=w, and the resistance R for charge transport in a direction parallel to the upper surface of the resistive layer 16 equals the sheet resistivity $R_s$, i.e. $R=R_s$. In order to better distinguish surface resistivity from total resistance, surface resistivity is usually measured in the units "Ohm per square".

The resistive layer 16 may be inhomogeneous so that a resistance for charge transport along a direction Z perpendicular to the upper surface of the resistive layer 16 is different from a resistance for charge transport along a direction parallel to the upper surface of the resistive layer 16. By adjusting the resistance for charge transport along direction Z and the surface resistivity of the resistive layer 16, the level to which induced charges are allowed to spread out along a lateral direction of the resistive layer 16 may be determined.

The dielectric layer 18 on which the resistive layer 16 is formed is a ceramic insulator at a thickness $t_2=300$ µm. The dielectric layer 18 doubles as a wall for the detector vessel, and hence has to be kept at a reasonable thickness to provide the required sturdiness. The inventors found that the ceramic insulator 18 having an excellent surface quality and the resistive ruthenium oxide layer 16 providing the required robustness make for a particularly useful combination. Good results have been obtained for dielectric layers with a thickness $t_2 \leq 2$ mm, but the invention may likewise be employed for dielectric layers with an even larger thickness.

The combination of ruthenium oxide for the resistive layer 16 and ceramics for the dielectric layer 18 also provide excellent outgasing properties. This allows the detector to reach and maintain a good vacuum, and to seal the detector vessel against the environment, in particular against the readout board 20. Good sealing is essential in many commercial applications, such as industrial fluorescence, radiology, and UV photodetection.

The dielectric layer 18 serves to capacitively couple the detector-readout interface to the underlying readout board 20. The inventors found that a good localisation and high spatial resolution can be achieved if $$t_2 << t_1 \in_2 / \in_1, \quad (1)$$

wherein $t_1$ and $t_2$ denote the thickness of the amplification gap A and dielectric layer 18, respectively, and $\in_1$ and $\in_2$ denote the dielectric constant of the gas in the amplification gap A and the dielectric constant of the dielectric layer 18, respectively. Preferably, $t_2 \leq 0.1 \times t_1 \times \in_2 / \in_1$, and particularly $t_2 \leq 0.01 \times t_1 \times \in_2 / \in_1$.

In the embodiment described with reference to FIGS. 1 and 2, $t_2=300$ µm, $t_1=124$ µm, and $\in_1=10$. If the ceramic of the dielectric layer 18 is chosen such that $\in_2$ is greater 50, Equation (1) is satisfied, and an efficient capacitive coupling and good spatial resolution may be achieved.

In general, ceramics can provide large dielectric constants, which can reach values of several hundreds to several thousands. This opens up the possibility to select, when it is desired, a thick insulator layer 18 without violating Equation (1). This may allow to form thicker and hence more robust detector walls.

If the thickness $t_2$ of the dielectric layer 18 is large, induced signals will spread out far in the lateral direction. This may permit the use of larger pixel chips in the underlying readout board 20, which may reduce the demands on the readout board 20 and may lead to significantly lower production costs.

A large spreadout of the induced signals in the lateral direction would at first sight seem to severely degrade the spatial resolution and hence the detector performance. However, this effect can be countered by pad sharing, or by estimating the location of the event from the ratio of charges induced on neighbouring readout pads. Surprisingly then, the spreading of charges over large areas by means of charge spreading may still allow to provide a detector with high spatial resolution. This is in contrast to conventional MicroMegas detectors, which usually require small and narrow high-density anode readout pads in order to achieve good spatial resolution.

The readout board 20 can be a printed circuit board or pixel chip such as the "MEDIPIX" chip described in M. Campbell et al., Nucl. Instrum. Meth. A540 (2005) 295-304, or a similar integrated chip. FIG. 1 shows the detector-readout interface when it is separated from the readout board 20, whereas FIG. 2 shows the same configuration, but with the readout board 20 mechanically coupled to the lower surface of dielectric layer 18.

The readout board 20 may be equipped with a square of 256×256 pixels of 55 µm×55 µm each, wherein each of the square pixels may be connected to its respective pre-amplifier, discriminator and digital counter for data analysis. Hence, all the readout electronics is incorporated into the readout board 20, and no readout electronics needs to be incorporated into the detector-readout interface or the detector core itself. Signal transfer between the charges collected on the resistive layer 16 and the readout pixels on readout board 20 is exclusively by means of capacitive charge coupling via the dielectric layer 18. No electrically conductive connections for coupling between the detector-readout interface and the readout board 20 are required.

This allows a modular detector configuration, in which the readout board 20 may be reversibly coupled to the lower side of the dielectric layer 18 to form the detector configuration shown in FIG. 2, but may be disconnected easily for repair and maintenance, as shown in FIG. 1. When connected, the through-holes 12 in the mesh 10 are preferably positioned exactly above the readout pixels in the readout board 20, in order to avoid interference patterns.

In combination with the dielectric layer 18, the resistive layer 16 provides full spark protection of the readout board 20. There is no need for an additional high-resistive layer formed on the readout board 20, and there is no need for additional protecting circuits either. This allows to reduce both the size and complexity of the detector device, and avoids detector dead space.

In operation, the resistive layer 16 may be connected to ground to serve as the anode of the MicroMegas detector. Polarisation means (not shown) are electrically coupled to the drift electrode (not shown) and mesh electrode 10 to raise the drift electrode to a first potential and the mesh electrode to a second potential higher than the first potential. The potentials are selected such that the electric field generated in the amplification gap A between the mesh 10 and the resistive layer 16 is much stronger, for instance more than ten times stronger than the electrical field generated in the conversion gap C between the drift electrode and the mesh electrode 10. The electrical field generated in the conversion gap C may typically amount to 1 kV/cm, whereas the electrical field generated in the amplification gap A may be chosen at 50 kV/cm.

When an ionising particle passes through the MicroMegas detector, it ionises the gas located in the conversion gap C and typically creates about ten primary electrons in that gap. The primary electrons are dragged through the holes 12 formed in the mesh electrode 10 and into the amplification gap A. The crossing through the mesh 10 is facilitated by the high ratio between the field created in the amplification gap A and the field created in the conversion gap C. After passing through the mesh 10, the primary electrons are accelerated by means of the strong field that exists in the amplification gap A, and each produce secondary electrons when colliding with gas molecules present inside the amplification gap A. Each of the secondary electrons may then itself produce further electrons by impact ionisation, so that an avalanche of electrons is generated inside the amplification gap A and dragged towards the resistive layer anode 16.

The electrons collected on the anode layer 16 induce corresponding charges in the underlying pixels of readout board 20 by means of capacitive coupling via the dielectric layer 18. These charges may be detected by reading out the pixels at regular intervals. An analysis of the amount and ratio of charges induced on neighbouring pixels allows to infer the position of the avalanche associated with the primary electron with high spatial resolution, from which the path of the incident particle may be reconstructed.

The inventors have tested the detector-readout interface according to the present invention with a small prototype of 5 cm×5 cm and have found a gas gain above $10^5$, and an energy resolution with 6 keV photons of 18% full width at half maximum. Signals induced by means of capacitive coupling were observed with a readout board 20 comprising a MEDIPIX chip and were compared to those induced on the cathode. As expected, the signal was entirely propagated to the induction plane, and the loss was negligible. At the same time, discharges were highly suppressed.

The embodiments described above and the accompanying figures merely serve to illustrate the detector-readout interface and particle detector according to the present invention and the beneficial effects associated therewith, and should not be understood to imply any limitation. The scope of the patent is solely determined by the following claims.

REFERENCE SIGNS 10 mesh (electrode)
12 through-holes in mesh electrode 10
14 pillars
16 resistive layer
18 dielectric layer
20 readout board

The invention claimed is:

1. A detector-readout interface for an avalanche particle detector, comprising:
a gas chamber of said avalanche particle detector, said gas chamber comprising an amplification gap or a collection gap;
a resistive layer formed at a bottom side of said gas chamber; and
a dielectric layer formed under said resistive layer;
wherein said detector-readout interface is adapted to be capacitively coupled to a readout board that comprises readout electronics for said avalanche particle detector;
and wherein the thickness $t_2$ of said dielectric layer and the thickness $t_1$ of said amplification gap or collection gap, respectively, are chosen such that $t_2 < t_1 \times \in_2 / \in_1$, wherein $\in_1$ denotes the dielectric constant of a gas filling of said amplification gap or collection gap, respectively, and $\in_2$ denotes the dielectric constant of said dielectric layer.

2. The detector-readout interface according to claim 1, wherein said detector-readout interface does not comprise readout electronics for said avalanche particle detector, and does not comprise electrically conductive connections for coupling to said readout board.

3. The detector-readout interface according to claim 1, wherein said resistive layer is a continuous layer, and preferably extends across the entire lower surface area of said gas chamber.

4. The detector-readout interface according to claim 1, wherein at least one of said resistive layer or said dielectric layer seal said gas chamber.

5. The detector-readout interface according to claim 1, wherein $t_2 \leq 0.2\, t_1 \times \in_2 / \in_1$.

6. The detector-readout interface according to claim 1, wherein $t_2 \leq 0.1\, t_1 \times \in_2 / \in_1$.

7. The detector-readout interface according to claim 1, wherein said dielectric layer has a dielectric constant $\in_2 \geq 10$.

8. The detector-readout interface according to claim 1, wherein said dielectric layer has a dielectric constant $\in_2 \geq 100$.

9. The detector-readout interface according to claim 1, wherein said dielectric layer has a thickness $t_2 \geq 10\,\mu m$.

10. The detector-readout interface according to claim 1, wherein said dielectric layer has a thickness $t_2 \geq 50\,\mu m$.

11. The detector-readout interface according to claim 1, wherein said resistive layer has a thickness in a range of 3 μm to 50 μm.

12. The detector-readout interface according to claim 1, wherein said resistive layer has a thickness in a range of 5 μm to 30 μm.

13. The detector-readout interface according to claim 1, further comprising:

first and second plane electrodes placed in said gas chamber;
said first electrode and said second electrode delimiting a conversion gap for generation of electrons by incident particles;
said second electrode perforated by holes; and
said second electrode and said resistive layer delimiting said amplification gap for multiplication of electrons in an avalanche process.

14. The detector-readout interface according to claim 1, further comprising:
first and second plane electrodes placed in said gas chamber;
wherein said first electrode is spaced both from said second electrode and from said resistive layer and comprises an insulator having first and second metal coating layers on opposed surface sides thereof, and a plurality of holes extending through said first electrode; and
a polarization element coupled to said coating layers and adapted to raise said first coating layer to a first potential and to raise said second coating layer to a second potential higher than said first potential.

15. An avalanche particle detector, comprising:
a detector-readout interface according to claim 1; and
a readout board that comprises readout electronics for said avalanche particle detector;
wherein said detector-readout interface is capacitively coupled to said readout board.

16. The avalanche particle detector according to claim 15, wherein said readout board comprises a pixel chip or an integrated chip.

17. The avalanche particle detector according to claim 15, wherein said detector-readout interface is reversibly connected to said readout board.

18. The avalanche particle detector according to claim 15, wherein said detector-readout interface does not comprise electrically conductive connections coupling said detector-readout interface to said readout board.

* * * * *